United States Patent [19]

Dan et al.

[11] Patent Number: 4,660,812

[45] Date of Patent: Apr. 28, 1987

[54] VIBRATION ISOLATING APPARATUS

[75] Inventors: Takuya Dan; Michihiro Orikawa; Hiroshi Kojima, all of Yokohama, Japan

[73] Assignee: Bridgestone Corporation, Tokyo, Japan

[21] Appl. No.: 787,436

[22] Filed: Aug. 20, 1985

[30] Foreign Application Priority Data

Aug. 27, 1984 [JP] Japan .................. 59-178004

[51] Int. Cl.$^4$ .............................. F16F 9/10
[52] U.S. Cl. .................... 267/140.1; 188/319
[58] Field of Search .... 267/140.1, 140.4, 141.2–141.7, 267/8 R, 35, 63 A, 63 R, 122, 152, 123, 153; 248/562, 636, 638, 659; 188/298, 299, 378, 379, 322.13, 319, 320; 180/300

[56] References Cited

U.S. PATENT DOCUMENTS

| | | | |
|---|---|---|---|
| 3,159,388 | 12/1964 | Wall | 267/123 |
| 3,361,216 | 1/1968 | Walker | 188/298 X |
| 4,383,679 | 5/1983 | Kakimoto | 267/140.1 X |
| 4,568,069 | 2/1986 | Poupard | 243/562 X |

FOREIGN PATENT DOCUMENTS

| | | | |
|---|---|---|---|
| 0027751 | 4/1981 | European Pat. Off. | 267/8 R |
| 3210731 | 10/1983 | Fed. Rep. of Germany | 267/140.1 |
| 3340153 | 8/1984 | Fed. Rep. of Germany | 267/8 R |
| 0066539 | 6/1981 | Japan . | |
| 0076340 | 5/1982 | Japan . | |
| 0037337 | 3/1983 | Japan . | |
| 0065635 | 4/1984 | Japan | 267/140.1 |
| 0097334 | 6/1984 | Japan | 267/140.1 |
| 2041485 | 9/1980 | United Kingdom | 267/8 R |

Primary Examiner—Duane A. Reger
Attorney, Agent, or Firm—Parkhurst & Oliff

[57] ABSTRACT

A vibration isolating apparatus is mounted on a vehicle body so as to absorb vibrations from a vibration source such as an engine. The apparatus includes a deformable liquid chamber which is divided into small liquid chambers by means of a partition plate. A bore which is formed in the partition plate is opened and closed by means of a valve, whereby the small liquid chambers are communicated with and shut off from each other. As a means for absorbing low-frequency vibrations, an orifice is provided which provides communication between the small liquid chambers. When a high-frequency vibration is generated, the valve is opened, and the bore of the partition plate causes liquid-mass resonance. A part of one of the small liquid chambers is constituted by a diaphragm through which a valve-driving force is transmitted.

7 Claims, 4 Drawing Figures (A)

(B)

(A)

(B)

VIBRATION ISOLATING APPARATUS

BACKGROUND OF THE INVENTION

1. Field of the Invention

The present invention relates to a vibration isolating apparatus capable of damping and absorbing vibrations from a vibration source.

2. Description of the Related Art

One type of previously proposed vibration isolating apparatus includes a hollow chamber which is constituted by a hollow molded article with resiliency in such a manner as to enable it to be employed as a liquid chamber and which is partitioned into small liquid chambers through an orifice.

This type of vibration isolating apparatus is arranged such that any vibration generated is absorbed by means of the internal friction occurring between the hollow molded article and the liquid sealed therein and by means of the fluid resistance of the liquid passing through the orifice.

However, the vibration isolating apparatus of the above-described type has an inconveniently limited capacity to absorb vibrations of various frequencies, so that it is not possible for the apparatus to absorb vibrations over a wide frequency range. In particular, high-frequency vibrations easily cause the orifice to be clogged or loaded, which fact makes it impossible for the orifice to serve to absorb any vibration.

SUMMARY OF THE INVENTION

In view of the above-described circumstances, it is a primary object of the present invention to provide a vibration isolating apparatus capable of absorbing vibrations over a widened frequency range.

To this end, the invention provides a vibration isolating apparatus in which a hollow chamber which is constituted by a hollow molded article with resiliency is employed as a liquid chamber and which is partitioned into small liquid chambers through an orifice and a valve mechanism which is opened or closed in accordance with the frequency of vibrations so as to allow both the small liquid chambers to be communicated with or shut off from each other.

Accordingly, in the vibration isolating apparatus of the invention, vibrations of relatively low frequencies are absorbed by virtue of the orifice, while vibrations of relatively high frequencies are absorbed by means of liquid-mass resonance which occurs in the vicinity of the valve mechanism as a result of a communicating opening which is formed between the small liquid chambers by opening the valve mechanism, the communicating opening having a cross-sectional area larger than that of the orifice.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
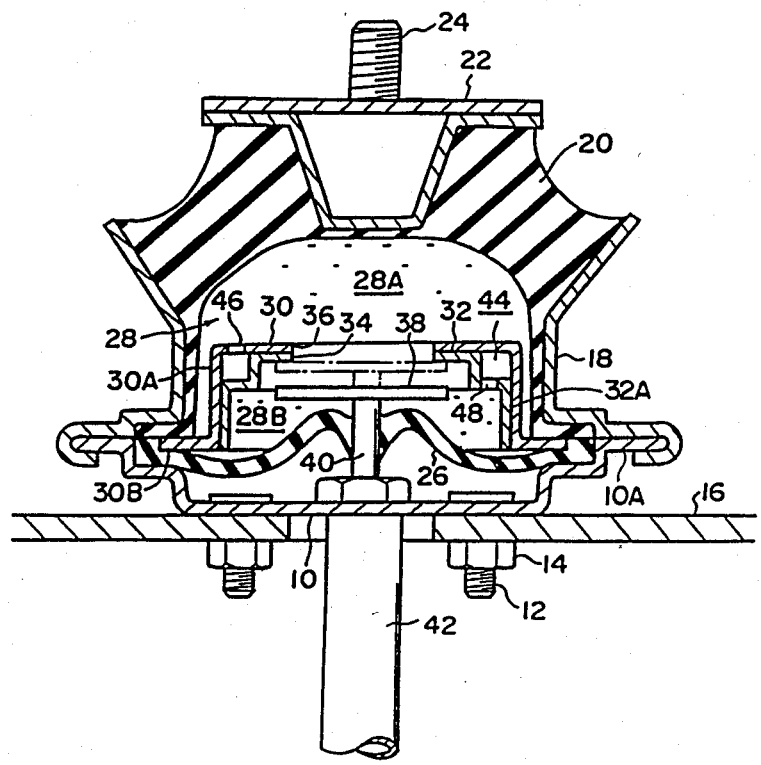
FIG. 1 is a sectional view of one embodiment of the vibration isolating apparatus according to the present invention.

Referring first to FIG. 1 which shows one embodiment of the vibration isolating apparatus according to the present invention, a base plate 10 is secured to a vehicle body 16 by employing bolts 12 and nuts 14.

The base plate 10 has a flange portion 10A projecting upwardly from its periphery. The lower end portion of an outer plate 18 which has its axis extending vertically is secured to the flange portion 10A by means of caulking. The outer periphery of a rubber member 20 is bonded to the inner periphery of the upper end portion of the outer plate 18 by means of vulcanization. The rubber member 20 has a top plate 22 connected to the center of its upper portion. An automotive engine (not shown) is mounted on the top plate 22 and is secured to the latter by a bolt 24 which projects upwardly from the upper surface of the top plate 22.

The periphery of a diaphragm 26 is secured between the outer plate 18 and the base plate 10. Thus, the inside of the hollow molded article which is defined between the diaphragm 26, the outer plate 18 and the rubber member 20 constitutes a liquid chamber 28. An incompressible liquid such as water is sealed in the liquid chamber 28.

The liquid chamber 28 is provided therein with a partition plate 30. The periphery of the partition plate 30 is bent downwardly to provide a tubular portion 30A. The lower end portion of the tubular portion 30A is bent such as to constitute a flange portion 30B which extends radially outward. The flange portion 30B is firmly clamped between the diaphragm 26 and the outer plate 18. Thus, the partition plate 30 divides the liquid chamber 28 into upper and lower liquid chambers 28A and 28B.

Figure 2:
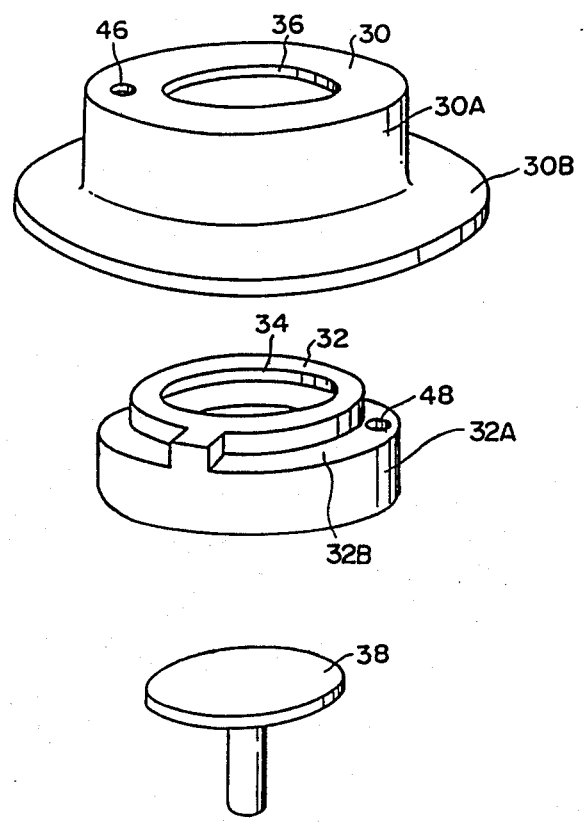
FIG. 2 is an exploded perspective view which shows an orifice and a valve mechanism employed in the embodiment.

As also shown in FIG. 2, an abutment plate 32 is secured to the bottom surface of the partition plate 30. The abutment plate 32 has a circular bore 34 formed in its center. The bore 34 allows the upper and lower liquid chambers 28A and 28B to communicate with each other, in cooperation with a circular bore 36 which is formed in the partition plate 30.

The circular bore 34 is adapted to be closed in an ordinary state by means of a valve body 38 which abuts against the lower side of the abutment plate 32. The valve body 38 is secured to the distal end of a driving shaft 40, which extends through the diaphragm 26 and is firmly connected to the latter by vulcanization or other similar means. The driving shaft 40 is integrally connected to the piston rod of an air cylinder 42 which is secured to the base plate 10. Thus, the air cylinder 42 which serves as a drive source enables the valve body 38 to come in and out of contact with the abutment plate 32 so that the circular bore 34 is closed and opened as desired.

A tubular portion 32A is formed along the outer periphery of the abutment plate 32 and is secured to the inner periphery of the tubular portion 30A of the partition plate 30. The tubular portion 32A is formed with a step 32B, and a ring-shaped orifice 44 is thereby defined between the step 32B and the partition plate 30. As will be clear from FIG. 2, the orifice 44 has a C-shaped planar configuration. One end portion of the orifice 44 is communicated with the upper liquid chamber 28A through a circular bore 46 which is formed in the partition plate 30 adjacent to the bore 36 thereof, while the other end portion of the orifice 44 is communicated with the lower liquid chamber 28B through a circular bore 48 which is formed in the step 32B of the abutment plate 32. Accordingly, the orifice 44 serves as a restricting passage which provides communication between the upper and lower liquid chambers 28A and 28B.

The following is a description of the operation of the above-described embodiment.

When the automotive engine mounted on the top plate 22 vibrates, it is possible for the rubber member 20 to absorb this vibration by virtue of its vibration damping function which works on the basis of the internal friction occurring between the rubber member 20 and the liquid sealed therein.

Figure 3:
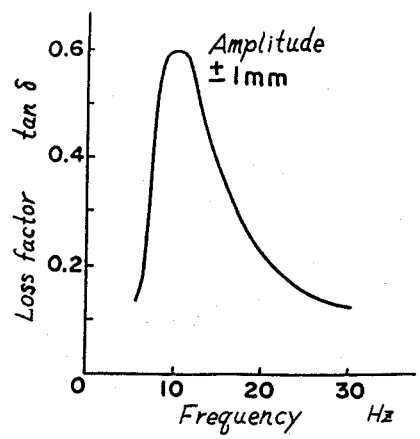
FIGS. 3 and 4 are graphs showing the relationship between the frequency and the loss factor and that between the frequency and the dynamic spring constant in the embodiment.
Figure 3:
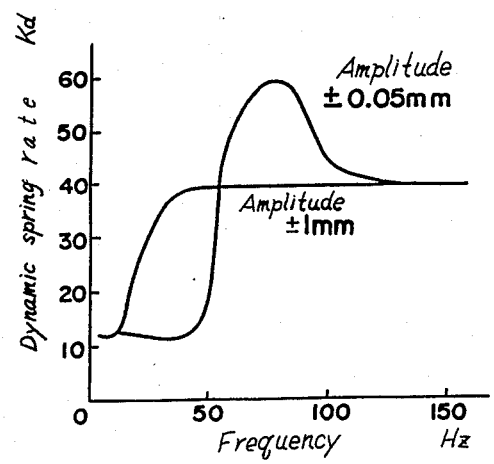

As the pressure in the upper liquid chamber 28A is raised by the action of the vibration, the liquid within the upper liquid chamber 28A is forced to move to the lower liquid chamber 28B through the orifice 44, while as the pressure in the upper liquid chamber 28A is lowered by the action of the vibration, the liquid within the lower liquid chamber 28B is forced to move to the upper liquid chamber 28A through the orifice 44. During this reciprocating movement of the liquid, a damping action occurs at the orifice 44 on the basis of the viscous resistance, whereby the vibration isolating effect is improved. The vibration damping characteristics of the embodiment in this case are shown in FIGS. 3(A) and 3(B).

When such a vibration takes place, the diaphragm 26 is elastically deformed as the lower liquid chamber 28B is expanded and contracted. In this case, however, since the driving shaft 40 extending through the diaphragm 26 has a relatively small diameter, the elastic deformation of the diaphragm 26 takes place with a relatively small restriction, and it is thereby possible to obtain an advantageously large loss factor such as that shown in FIG. 3(A).

Figure 4:
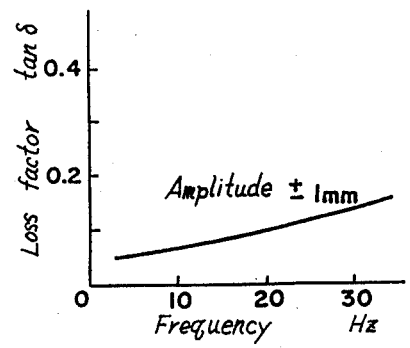
Figure 4:
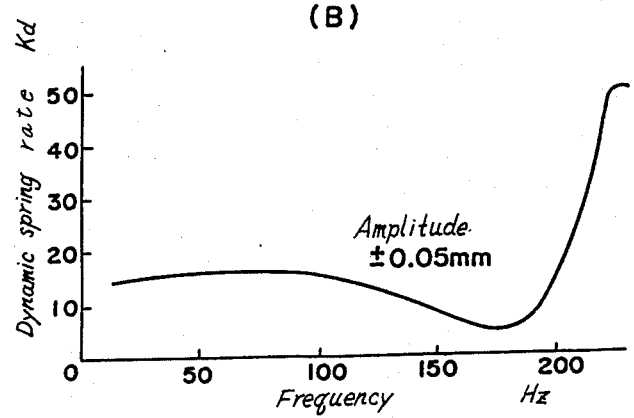

As the frequency of vibrations increases, there is a risk of the liquid getting caught in the orifice 44. In such a case, the air cylinder 42 is actuated such as to draw the driving shaft 40 into the air cylinder 42, whereby the valve body 38 is separated from the circular bore 34 so that the upper and lower liquid chambers 28A and 28B are communicated with each other through the circular bores 34 and 36. Thus, it is possible for the liquid in the upper and lower liquid chambers 28A and 28B to circulate freely through the bores 34 and 36. In consequence, the liquid in the vicinity of the bores 34 and 36 causes liquid-mass resonance, thus enabling the vibrations to be damped. The vibration damping characteristics of the embodiment with respect to vibrations in a high-frequency range are shown in FIGS. 4(A) and 4(B). As will be clear from the graphs of these Figures, the dynamic spring rate decreases as the frequency increases, so that it is advantageously possible to absorb vibrations in a relatively high-frequency region.

It is to be noted that, although the above-described embodiment exemplifies a structure in which the valve body 38 is separated from the circular bores 34 and 36 when a vibration of a relatively high frequency is generated, it is possible for a frequency range of absorbable vibrations to be changed by actuating the air cylinder 42 at a desired vibration frequency.

It is to be noted also that, although the air cylinder 42 is employed as a drive source in the above-described embodiment, it is also possible when carrying out the present invention to employ other types of drive sources in addition to the air cylinder, such as a driving structure in which the driving force of a hydraulic cylinder or the rotational force of a motor is transmitted to the valve body 38 through a cam plate.

As has been described above, the vibration isolating apparatus according to the invention employs as a liquid chamber a hollow chamber which is constituted by a hollow molded article with resiliency. The liquid chamber is partitioned into small liquid chambers through an orifice and a valve mechanism which is opened or closed in accordance with the frequency of vibrations so that both the small liquid chambers are communicated with or shut off from each other. It is therefore advantageously possible to absorb vibrations over a widened frequency range.

What is claimed is:

1. A vibration isolating apparatus interposed between a vibration generating portion and a vibration receiving portion so as to absorb vibrations from said vibration generating portion, comprising:
    (a) a base plate secured to said vibration receiving portion;
    (b) a resilient member supported on said base plate to define a hollow chamber between said resilient member and said base plate;
    (c) a top plate secured to said resilient member to be applied for mounting said vibration generating portion thereon;
    (d) a diaphragm disposed in the hollow chamber to define a liquid chamber between said diaphragm and said resilient member;
    (e) a partition plate disposed in said liquid chamber to divide said liquid chamber into two small liquid chambers;
    (f) a large orifice formed on said partition plate to provide communication between said small liquid chambers;
    (g) a small orifice provided on said partition plate around said large orifice for providing communication between said small liquid chambers, the opening area of the small orifice being smaller than that of said large orifice;
    (h) a valve body disposed in the liquid chamber, for opening and closing said large orifice; and
    (i) a cylinder fixed to said base plate and having a driving shaft fixed to said valve body through said diaphragm, said cylinder driving said driving shaft to open said large orifice when a vibration equal to or greater than a predetermined frequency is generated from said vibration generating portion;
    whereby vibrations below said predetermined frequency are absorbed by means of a viscous resistance caused by liquid flowing through said small orifice between said small liquid chambers; and
    further whereby vibrations equal to or greater than said predetermined frequency are absorbed by means of liquid-mass resonance caused by liquid flowing through said large orifice between said small liquid chambers.

2. A vibration isolating apparatus according to claim 1, wherein said base plate has a flange portion formed at its periphery and said flange portion is fixed to a tubular outer plate disposed around an outer periphery of said resilient member, said resilient member being bonded to an inner periphery of said tubular outer portion.

3. A vibration isolating apparatus according to claim 2, wherein said partition plate is secured at its periphery to said resilient member.

4. A vibration isolating apparatus according to claim 3, wherein said partition plate has an abutment plate secured thereto in such a manner that said small orifice is defined therebetween.

5. A vibration isolating apparatus according to claim 4, wherein said partition plate and said abutment plate are respectively formed with bores which respectively communicate with said small liquid chambers.

6. A vibration isolating apparatus according to claim 5, wherein said resilient member is a rubber member.

7. A vibration isolating apparatus according to claim 6, wherein said vibration receiving portion is a vehicle body.

* * * * *